(12) United States Patent
End, III

(10) Patent No.: US 7,185,041 B1
(45) Date of Patent: Feb. 27, 2007

(54) CIRCUIT AND METHOD FOR HIGH-SPEED EXECUTION OF MODULO DIVISION

(75) Inventor: Joseph H. End, III, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 715 days.

(21) Appl. No.: 09/971,949

(22) Filed: Oct. 5, 2001

(51) Int. Cl.
*G06F 7/52* (2006.01)

(52) U.S. Cl. .................... 708/656; 708/491

(58) Field of Classification Search ............... 708/504, 708/650, 653, 655, 656, 491
See application file for complete search history.

(56) References Cited

U.S. PATENT DOCUMENTS

| | | | |
|---|---|---|---|
| 3,733,477 A * | 5/1973 | Tate et al. ............... | 708/656 |
| 4,464,650 A | 8/1984 | Eastman et al. | |
| 4,558,302 A | 12/1985 | Welch | |
| 5,155,484 A | 10/1992 | Chambers, IV | |
| 5,412,384 A | 5/1995 | Chang et al. | |
| 5,452,405 A | 9/1995 | Vondran, Jr. | |
| 5,475,388 A | 12/1995 | Gormish et al. | |
| 5,532,693 A | 7/1996 | Winters et al. | |
| 5,638,314 A * | 6/1997 | Yoshida ................... | 708/656 |
| 5,838,264 A | 11/1998 | Cooper | |
| 5,870,497 A | 2/1999 | Galbi et al. | |
| 5,903,230 A | 5/1999 | Masenas | |
| 6,040,790 A | 3/2000 | Law | |

* cited by examiner

*Primary Examiner*—Chuong D. Ngo
(74) *Attorney, Agent, or Firm*—Nathan Cass; Mark T. Starr; Woodcock Washburn

(57) ABSTRACT

A division operation is simulated by performing multiple subtractions, in parallel, each of which represents the subtraction of a different multiple of the divisor from the dividend. Each subtraction produces a possible remainder value, but only one subtraction will result in a valid remainder—the one representing the divisor multiplied by the actual quotient that would result from the division operation—and that remainder is then identified as the modulo output of the division operation.

14 Claims, 12 Drawing Sheets

FIGURE 5

```
--Selects which of the adder output values is the Remainder Output.
   Signal RMDR_SEL : std_logic_vector( 6 downto 0); -- 7 bit vector of signals
used
      -- to select the true remainder from the plurality of remainders.
      -- The vector is "one hot" encoded.
   Signal CY_BR_VEC: std_logic_vector(5 downto 0);   -- Vector of CY_BR1...6
bits.
      -- composed of the plurality of carry/borrow outputs of the adders.
   Signal QUOTIENT_VAL: std_logic_vector(2 downto 0);  -- Numerical value of
quotient.

-- Adder 0 was reduced out of the design and thus eliminated, being replaced
with
--   a straight-through bus, leaving the other 6 adders physically implemented.
-- Create a vector from the adder CY_BR outputs so they can be referenced as a
group
--   in the CASE statement in the RMDR_SEL_LOGIC process, below.
   CY_BR_VEC(0) <= CY_BR1; -- CY_BR output of adder 1 is bit 0 of CY_BR_VEC.
   CY_BR_VEC(1) <= CY_BR2; -- CY_BR output of adder 2 is bit 1 of CY_BR_VEC.
   CY_BR_VEC(2) <= CY_BR3; -- CY_BR output of adder 3 is bit 2 of CY_BR_VEC.
   CY_BR_VEC(3) <= CY_BR4; -- CY_BR output of adder 4 is bit 3 of CY_BR_VEC.
   CY_BR_VEC(4) <= CY_BR5; -- CY_BR output of adder 5 is bit 4 of CY_BR_VEC.
   CY_BR_VEC(5) <= CY_BR6; -- CY_BR output of adder 6 is bit 5 of CY_BR_VEC.

---------

-- Remainder Select control output to control Remainder Mux, item # 19.
RMDR_SEL_LOGIC : process (CY_BR_VEC)

-- RMDR_SEL output signal names and values.  "One-hot" encoded.
Constant ZERO : std_logic_vector(6 downto 0) := "0000001";  -- Select "adder 0"
output.
Constant ONE  : std_logic_vector(6 downto 0) := "0000010";  -- Select adder 1
output.
Constant TWO  : std_logic_vector(6 downto 0) := "0000100";  -- Select adder 2
output.
Constant THREE: std_logic_vector(6 downto 0) := "0001000";  -- Select adder 3
output.
Constant FOUR : std_logic_vector(6 downto 0) := "0010000";  -- Select adder 4
output.
Constant FIVE : std_logic_vector(6 downto 0) := "0100000";  -- Select adder 5
output.
Constant SIX  : std_logic_vector(6 downto 0) := "1000000";  -- Select adder 6
output.

-- CY_BR_VEC names and values which match associated numerical quotient values.
Constant QUOT_0 : std_logic_vector(5 downto 0) := "000000";  -- Quotient of
dividend is 0.
Constant QUOT_1 : std_logic_vector(5 downto 0) := "000001";  -- Quotient of
dividend is 1.
Constant QUOT_2 : std_logic_vector(5 downto 0) := "000011";  -- Quotient of
dividend is 2.
Constant QUOT_3 : std_logic_vector(5 downto 0) := "000111";  -- Quotient of
dividend is 3.
Constant QUOT_4 : std_logic_vector(5 downto 0) := "001111";  -- Quotient of
dividend is 4.
Constant QUOT_5 : std_logic_vector(5 downto 0) := "011111";  -- Quotient of
dividend is 5.
Constant QUOT_6 : std_logic_vector(5 downto 0) := "111111";  -- Quotient of
dividend is 6.
```

FIGURE 6A

```
-- Perform selection function.
-- Note: Interpretation of the CASE statement.  Example: "WHEN QUOT_0 =>" means,
"When the
-- value of CY_BR_VEC equals the value assigned to the constant, QUOT_0, execute
the
-- following statements until the next "WHEN..." statement".  Then exit the
CASE.

Case CY_BR_VEC is
    When QUOT_0 =>   -- Quotient of dividend is 0.  "Adder 0" has correct mod
output value.
        RMDR_SEL      <= ZERO;         -- Select remainder 0.
        QUOTIENT_VAL  <= "000"    -- Quotient value is 0 (binary).
    When QUOT_1 =>   -- Quotient of dividend is 1.  Adder 1 has correct mod
output value.
        RMDR_SEL      <= ONE;          -- Select remainder 1.
        QUOTIENT_VAL  <= "001"    -- Quotient value is 1 (binary).
    When QUOT_2 =>   -- Quotient of dividend is 2.  Adder 2 has correct mod
output value.
        RMDR_SEL      <= TWO;          -- Select remainder 2.
        QUOTIENT_VAL  <= "010"    -- Quotient value is 2 (binary).
    When QUOT_3 =>   -- Quotient of dividend is 3.  Adder 3 has correct mod
output value.
        RMDR_SEL      <= THREE;        -- Select remainder 3.
        QUOTIENT_VAL  <= "011"    -- Quotient value is 3 (binary).
    When QUOT_4 =>   -- Quotient of dividend is 4.  Adder 4 has correct mod
output value.
        RMDR_SEL      <= FOUR;         -- Select remainder 4.
        QUOTIENT_VAL  <= "100"    -- Quotient value is 4 (binary).
    When QUOT_5 =>   -- Quotient of dividend is 5.  Adder 5 has correct mod
output value.
        RMDR_SEL      <= FIVE;         -- Select remainder 5.
        QUOTIENT_VAL  <= "101"    -- Quotient value is 5 (binary).
    When QUOT_6 =>   -- Quotient of dividend is 6.  Adder 6 has correct mod
output value.
        RMDR_SEL      <= SIX;          -- Select remainder 6.
        QUOTIENT_VAL  <= "110"    -- Quotient value is 6 (binary).

End case;
```

FIGURE 6B

Note: Interpretation of VHDL:
  a) CASE statement. Example:
        Case SEQ_STATE is
          WHEN CYCLE_1 then
      "WHEN CYCLE_1" means, "When the value of SEQ_STATE equals the value assigned to the constant, CYCLE_1, execute the statements following the WHEN until the next "WHEN..." statement". Then exit the CASE.
  b) The symbol "<=" is interpreted as: "is assigned the value of...".

```
***************** BEGINNING OF "VHDL" DESCRIPTION **********************
--Signal declarations and definitions.
    Signal CY_BR_VEC: std_logic_vector(3 downto 0);  -- 4 bit vector of CY_BR signals.
        -- composed of the plurality of carry/borrow outputs of the adders.
    Signal QUOTIENT_VAL: std_logic_vector(3 downto 0); -- 4 bit numeric value of
quotient.
    Signal SEQ_STATE   : std_logic_vector(1 downto 0);  -- Sequence Controller state
vector.
    Signal SEQ_STATE_N: std_logic_vector(1 downto 0);  -- Seq Controller next state
vector.

-- Output signals of Remainder Selection Logic, 16
    Signal RMDR_LD: std_logic;      -- Remainder Reg load-enable signal.
    Signal RMDR_SEL : std_logic_vector( 5 downto 0); -- 6 bit vector of signals used
        -- to select the true remainder from the plurality of remainders.
        -- The vector is "one hot" encoded.
    Signal RMDR_VALID: std_logic;   -- Tags the contents of the Remainder Reg as valid.

-- Signals to select subsets of TVn values to apply to adder inputs "A".
    Signal SEL_SET_1 : std_logic;   -- Signal to apply TV1, TV2, TV3 and TV4.
    Signal SEL_SET_2 : std_logic;   -- Signal to apply TV5, TV6, TV7 and TV8.
    Signal SEL_SET_3 : std_logic;   -- Signal to apply TV9, TV10, TV11 and TV12.

-- Adder 0 was reduced out of the design and thus eliminated, being replaced with
--    a straight-through bus, leaving the other 6 adders physically implemented.
-- Create a vector from the adder CY_BR outputs so they can be referenced as a group
-- in the CASE statement in the RMDR_SEL_LOGIC process, below.
    CY_BR_VEC(0) <= CY_BR1; -- CY_BR output of adder 1 is bit 0 of CY_BR_VEC.
    CY_BR_VEC(1) <= CY_BR2; -- CY_BR output of adder 2 is bit 1 of CY_BR_VEC.
    CY_BR_VEC(2) <= CY_BR3; -- CY_BR output of adder 3 is bit 2 of CY_BR_VEC.
    CY_BR_VEC(3) <= CY_BR4; -- CY_BR output of adder 4 is bit 3 of CY_BR_VEC.
```

FIGURE 7A

```
-- **********  Behavior of Sequence Controller State Machine, 25 *************
SEQUENCE_CONTROLLER : process (RMDR_VALID, RESET) -- RMDR_VALID and RESET are input
                                                 -- signals.
-- The RMDR_VALID signal is generated in the RMDR_SEL_LOGIC process, below.

-- Sequence Controller state names and values.  Values are arbitrary.
Constant CYCLE_1 : std_logic_vector(1 downto 0) := "01";  -- Controller CYCLE_1 state.
Constant CYCLE_2 : std_logic_vector(1 downto 0) := "10";  -- Controller CYCLE_2 state.
Constant CYCLE_3 : std_logic_vector(1 downto 0) := "11";  -- Controller CYCLE_3 state.

-- Sequencer behavior
   If RESET = '1' then
      SEQ_STATE    <= CYCLE_1;  -- Reset to CYCLE_1 state.
   else   -- Normal sequence controller operation.
      Case SEQ_STATE is
         WHEN CYCLE_1 then
            If RMDR_VALID = '1' then   -- The true remainder is in this set.
               SEQ_STATE_N  <= CYCLE_1; -- Stay in CYCLE_1 state.
            else                -- True remainder is not in this set.
               SEQ_STATE_N  <= CYCLE_2; -- Continue on to CYCLE_2 state.
            End if;
         WHEN CYCLE_2 then
            If RMDR_VALID = '1' then   -- The true remainder is in this set.
               SEQ_STATE_N  <= CYCLE_1; -- Go back to CYCLE_1 state.
            else                -- True remainder is not in this set.
               SEQ_STATE_N  <= CYCLE_3; -- Continue on to CYCLE_3 state.
            End if;
         WHEN CYCLE_3 then   -- True remainder MUST be in this set if not found so far.
            SEQ_STATE_N  <= CYCLE_1; -- Return to CYCLE_1 state.
      End Case;
End SEQUENCE_CONTROLLER process;
```

FIGURE 7B

```
-- **********  Behavior of Remainder Selection Logic, 16  *************

-- Remainder Select control output to control Remainder Mux, item # 19.
RMDR_SEL_LOGIC : process (SEQ_STATE,CY_BR_VEC)-- SEQ_STATE and CY_BR_VEC are input
                                             -- signals.
Note that RMDR_VALID signal output here is an input to the Sequencer Controller, above.

-- RMDR_SEL output signal names and values.  "One-hot" encoded.
Constant NONE : std_logic_vector(4 downto 0) := "00000";  -- Don't select any outputs.
Constant ZERO : std_logic_vector(4 downto 0) := "00001";  -- Select "adder 0" output.
Constant ONE  : std_logic_vector(4 downto 0) := "00010";  -- Select adder 1 output.
Constant TWO  : std_logic_vector(4 downto 0) := "00100";  -- Select adder 2 output.
Constant THREE: std_logic_vector(4 downto 0) := "01000";  -- Select adder 3 output.
Constant FOUR : std_logic_vector(4 downto 0) := "10000";  -- Select adder 4 output.

-- CY_BR_VEC names and values which match associated numerical quotient values.
Constant QUOT_A : std_logic_vector(3 downto 0) := "0000";  -- Quotient value is
0,4,8,12.
Constant QUOT_B : std_logic_vector(3 downto 0) := "0001";  -- Quotient value is 1,5 or
9.
Constant QUOT_C : std_logic_vector(3 downto 0) := "0011";  -- Quotient value is 2,6 or
10.
Constant QUOT_D : std_logic_vector(3 downto 0) := "0111";  -- Quotient value is 3,7 or
11.
Constant QUOT_E : std_logic_vector(3 downto 0) := "1111";  -- Quotient value is
unknown.

Case SEQ_STATE is                    -- Each value of SEQ_STATE selects a different set of
                                     -- combinational logic to be performed.
    When CYCLE_1 then  -- Perform sequencer cycle_1 logic function.
        SEL_SET_1 <= '1';   -- Apply TV1, TV2, TV3 and TV4 to adders.
        Case CY_BR_VEC is   -- Look at the CY_BR adder outputs.
            When QUOT_A =>   -- Quotient of dividend is 0.  This is the only state in
        which
                                 -- the "adder 0" output is considered.
                RMDR_SEL      <= ZERO;    -- ."Adder 0" has correct mod output value.
                QUOTIENT_VAL  <= "0000";  -- Quotient value is 0 (binary).
                RMDR_VALID    <= '1';     -- Remainder is valid.
                RMDR_LD       <= '1';     -- Load valid remainder into remainder reg, 23.
            When QUOT_B =>   -- Quotient of dividend is 1.
                RMDR_SEL      <= ONE;     -- Adder 1 has correct remainder output value.
                QUOTIENT_VAL  <= "0001";  -- Quotient value is 1 (binary).
                RMDR_VALID    <= '1';     -- Remainder is valid.
                RMDR_LD       <= '1';     -- Load valid remainder into remainder reg, 23.
            When QUOT_C =>   -- Quotient of dividend is 2.
                RMDR_SEL      <= TWO;     -- Adder 2 has correct remainder output value.
                QUOTIENT_VAL  <= "0010";  -- Quotient value is 2 (binary).
                RMDR_VALID    <= '1';     -- Remainder is valid.
                RMDR_LD       <= '1';     -- Load valid remainder into remainder reg, 23.
            When QUOT_D =>   -- Quotient of dividend is 3.
                RMDR_SEL      <= THREE;   -- Adder 3 has correct remainder output value.
                QUOTIENT_VAL  <= "0011";  -- Quotient value is 3 (binary).
                RMDR_VALID    <= '1';     -- Remainder is valid.
                RMDR_LD       <= '1';     -- Load valid remainder into remainder reg, 23.
            When QUOT_E =>   -- Quotient of dividend might be 4.
                RMDR_SEL      <= FOUR;    -- Adder 4 may have correct remainder output
        value.
                RMDR_VALID    <= '0';     -- Remainder is unknown.  Sequencer must continue.
                RMDR_LD       <= '1';     -- Load remainder into remainder reg, 23. It might
                                          -- be valid.  Must be tested next cycle.
        End case;
```

FIGURE 7C

```
When CYCLE_2 then    -- Perform sequencer cycle_2 logic function.
    SEL_SET_2 <= '1';    -- Apply TV5, TV6, TV7 and TV8 to adders.
    Case CY_BR_VEC is    -- Look at the CY_BR adder outputs.
        When QUOT_A =>   -- Quotient of dividend is 4.  This confirms the possibility.
            RMDR_SEL      <= NONE;    -- .All adder outputs are incorrect.
            QUOTIENT_VAL  <= "0100";  -- Quotient value is 4 (binary).
            RMDR_VALID    <= '1';     -- Remainder in Remainder Reg, 23, is valid.
            RMDR_LD       <= '0';     -- Don't load.  Hold valid remainder previously
                                      -- loaded into remainder reg, 23, in CYCLE_1.
        When QUOT_B =>   -- Quotient of dividend is 5.
            RMDR_SEL      <= ONE;     -- Adder 1 has correct remainder output value.
            QUOTIENT_VAL  <= "0101";  -- Quotient value is 5 (binary).
            RMDR_VALID    <= '1';     -- Remainder is valid.
            RMDR_LD       <= '1';     -- Load valid remainder into remainder reg, 23.
        When QUOT_C =>   -- Quotient of dividend is 6.
            RMDR_SEL      <= TWO;     -- Adder 2 has correct remainder output value.
            QUOTIENT_VAL  <= "0110";  -- Quotient value is 6 (binary).
            RMDR_VALID    <= '1';     -- Remainder is valid.
            RMDR_LD       <= '1';     -- Load valid remainder into remainder reg, 23.
        When QUOT_D =>   -- Quotient of dividend is 7.
            RMDR_SEL      <= THREE;   -- Adder 3 has correct remainder output value.
            QUOTIENT_VAL  <= "0111";  -- Quotient value is 7 (binary).
            RMDR_VALID    <= '1';     -- Remainder is valid.
            RMDR_LD       <= '1';     -- Load valid remainder into remainder reg, 23.
        When QUOT_E =>   -- Quotient of dividend might be 8.
            RMDR_SEL      <= FOUR;    -- Adder 4 may have correct remainder output
    value.
            RMDR_VALID    <= '0';     -- Remainder is unknown.  Sequencer must continue.
            RMDR_LD       <= '1';     -- Load remainder into remainder reg, 23. It might
                                      -- be valid.  Must be tested next cycle.
    End case;
When CYCLE_3 then    -- Perform sequencer cycle_3 logic function.
    SEL_SET_3 <= '1';    -- Apply TV9, TV10, TV11 and TV12 to adders.
    Case CY_BR_VEC is    -- Look at the CY_BR adder outputs.
        When QUOT_A =>   -- Quotient of dividend is 8.  This confirms the possibility.
            RMDR_SEL      <= NONE;    -- .All adder outputs are incorrect.
            QUOTIENT_VAL  <= "1000";  -- Quotient value is 8 (binary).
            RMDR_VALID    <= '1';     -- Remainder in Remainder Reg, 23, is valid.
            RMDR_LD       <= '0';     -- Don't load.  Hold valid remainder previously
                                      -- loaded into remainder reg, 23, in CYCLE_1.
        When QUOT_B =>   -- Quotient of dividend is 9.
            RMDR_SEL      <= ONE;     -- Adder 1 has correct remainder output value.
            QUOTIENT_VAL  <= "1001";  -- Quotient value is 9 (binary).
            RMDR_VALID    <= '1';     -- Remainder is valid.
            RMDR_LD       <= '1';     -- Load valid remainder into remainder reg, 23.
        When QUOT_C =>   -- Quotient of dividend is 10.
            RMDR_SEL      <= TWO;     -- Adder 2 has correct remainder output value.
            QUOTIENT_VAL  <= "1010";  -- Quotient value is 10 (binary).
            RMDR_VALID    <= '1';     -- Remainder is valid.
            RMDR_LD       <= '1';     -- Load valid remainder into remainder reg, 23.
        When QUOT_D =>   -- Quotient of dividend is 11.
            RMDR_SEL      <= THREE;   -- Adder 3 has correct remainder output value.
            QUOTIENT_VAL  <= "1011";  -- Quotient value is 11 (binary).
            RMDR_VALID    <= '1';     -- Remainder is valid.
            RMDR_LD       <= '1';     -- Load valid remainder into remainder reg, 23.
        When QUOT_E =>   -- Quotient of dividend is 12.
            RMDR_SEL      <= FOUR;    -- Adder 4 has correct remainder output value.
            QUOTIENT_VAL  <= "1100";  -- Quotient value is 12 (binary).
            RMDR_VALID    <= '1';     -- Remainder is valid.
            RMDR_LD       <= '1';     -- Load valid remainder into remainder reg, 23.
    End case;
End case;
```

FIGURE 7D

CIRCUIT AND METHOD FOR HIGH-SPEED EXECUTION OF MODULO DIVISION

FIELD OF THE INVENTION

The present invention relates generally to digital logic circuitry for performing arithmetic operations, and more particularly, to a circuit and method for high-speed execution of modulo division operations.

BACKGROUND

A modulo operation is a type of arithmetic division, except rather than returning the quotient resulting from a division of a dividend by a divisor, the modulo operation returns the remainder resulting from that division. One example of the use of a modulo division operation is in connection with hashing algorithms. Hashing algorithms often (but not always) employ a modulo operation to map an input string to a hash key used as an index into a hashing table. Common hashing algorithms process incoming data by taking the modulo of the input data with a large prime number as the divisor as part of the hashing computation.

Data compression techniques are one area in which hashing algorithms may be employed. Data compression is typically a numerically-intensive operation, and some compression techniques employ numerous divide/modulo arithmetic operations, each of which can consume numerous processor clock cycles.

Accordingly, there is a continuing need in the art for circuits and methods for optimizing the execution of modulo division operations, whether in connection with the performance of a hashing algorithm, data compression technique, or other application. The present invention addresses this need.

SUMMARY

The present invention is directed to circuits and methods for performing a modulo division operation, based on a simulated division of a dividend by a divisor. According to the invention, a division operation is simulated by performing multiple subtractions, in parallel, each of which represents the subtraction of a different integer multiple of the divisor from the dividend. Each subtraction produces a possible remainder value, but only one subtraction will result in a valid remainder—the one representing subtraction by the divisor multiplied by the actual quotient that would result from the division operation—and that remainder will be the modulo output of the division operation. The valid remainder will be less than the divisor.

All of the subtraction operations needed to cover the different possible quotients can be performed in parallel by a respective number of subtraction circuits. Preferably, the subtraction circuits are implemented by adder circuits that perform subtraction by two's complement addition. Alternatively, a lesser number of subtraction circuits can be used to perform a portion of the subtraction operations in parallel, followed by sequential reuse of those circuits to perform the other subtraction operations.

According to one embodiment, a circuit of the present invention comprises a plurality of subtraction circuits. Each subtraction circuit receives, as a first input, a common dividend signal representing the dividend. Each subtraction circuit further receives, as a second input, a signal representing a respective integer multiple of the divisor. This second input is referred to herein as a "respective test value".

Each subtraction circuit subtracts the respective test value (i.e., integer multiple of the divisor) from the common dividend input to produce a respective remainder value and a respective carry/borrow signal. From the totality of carry/borrow signals, a determination is then made to identify which of the remainder signals represents a true remainder of the division of the dividend by the divisor. That remainder is then selected for output as the modulo result of the division operation. The totality of carry/borrow signals can easily be used to additionally generate a quotient output from the circuit.

Preferably, each subtraction circuit comprises an adder that receives, as a first input, the common dividend signal and, as a second input, the two's complement of its respective test value (i.e., respective integer multiple of the divisor). The subtraction operation is thus performed by the adder using two's complement arithmetic.

A method of the present invention comprises the steps of providing a plurality of test value signals each representing a different integer multiple of the divisor, each test value signal corresponding to a different one of the possible quotients that can result from the division of the dividend by the divisor; separately subtracting each test value signal from the dividend, at least some of the subtractions being performed substantially simultaneously, to produce a respective plurality of possible remainder values; and selecting the remainder value that is less than the divisor and that resulted from a subtraction with the largest test value that is not borrowing (i.e. has a carry/borrow signal value of BORROW=FALSE). The subtraction step can be performed using adder circuits, wherein the test value signals are supplied as addends to the adder circuits in two's complement form, such that upon addition with the dividend, the different integer multiples of the divisor are effectively subtracted from the dividend.

Other features of the present invention will become evident hereinafter.

BRIEF DESCRIPTION OF THE DRAWINGS

The foregoing summary, as well as the following detailed description, is better understood when read in conjunction with the appended drawings. For the purpose of illustrating the invention, there are shown in the drawings various embodiments of the invention, it being understood, however, that the invention is not limited to the specific methods and instrumentalities disclosed. In the drawings:

FIG. 5 is a truth table providing further details of the operation of the circuitry of FIG. 2;

FIGS. 6A and 6B comprise a VHDL description providing still further details of the operation of the circuitry of FIG. 2; and FIGS. 7A–7D comprise a VHDL description providing still further details of the operation of the circuitry of FIG. 2A.

DETAILED DESCRIPTION OF THE INVENTION

Figure 1:
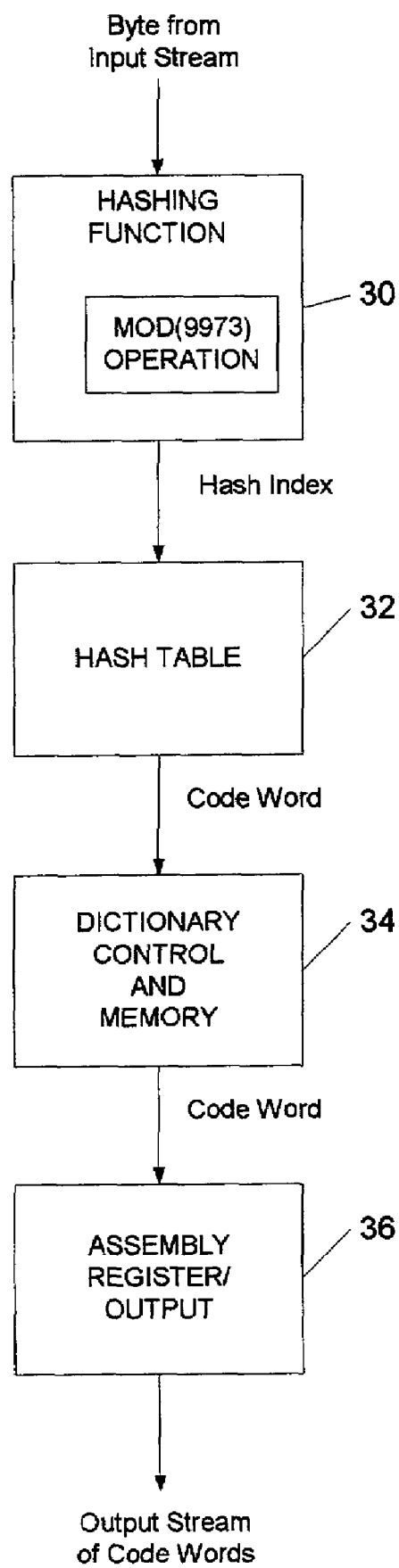
FIG. 1 is a block diagram of an exemplary hardware implementation of the LZW data compression algorithm, illustrating one exemplary application of the present invention.

In many applications that employ modulo division operations, such as, for example, certain hashing algorithms and data compression techniques, the dividend and divisor in these operations are both typically large, resulting in a quotient that ranges between zero and a relatively small, positive integer value. Consequently, rather than executing one algorithmic divide operation, it is more efficient to "simulate" division by performing successive subtractions, because the number of subtractions needed to simulate division in those cases is relatively small and the processor cycles required to perform the series of subtraction operations is usually less than that required to perform a single divide operation. For example, assume that the nature of the dividend and divisor are such that the expected quotient will always be in the range of from zero to six. In the worst case, therefore, the simulated division operation may require seven subtraction operations. Such a small number of subtraction operations can usually be achieved using less processor clock cycles than required for a single division operation.

According to the present invention, rather than performing successive subtraction operations until a valid remainder is output, the present invention performs multiple subtractions, simultaneously, in parallel, each of which represents the subtraction of a different multiple of the divisor from the dividend. For example, assuming again that the expected quotient will range between zero and six, seven different subtractions will be performed. Each subtraction will involve the subtraction of a different integer multiple of the divisor from the dividend. For example, one subtraction will perform (dividend−(divisor*1)), another subtraction will perform (dividend−(divisor*2)), another subtraction will perform (dividend−(divisor*3)), and so on, such that one subtraction operation is performed for each different multiple of the divisor by a possible quotient. Only one subtraction will result in a valid remainder—the one representing subtraction by the divisor multiplied by the actual quotient that would result from the same division operation—and that remainder will be the modulo output of the division operation. The valid remainder will be the one value greater than or equal to zero that is less than the divisor.

All of the subtraction operations needed to cover the different possible quotients can be performed in parallel by a respective number of subtraction circuits, or alternatively, a lesser number of subtraction circuits can be used to perform a portion of the subtraction operations in parallel, followed by reuse of those circuits to perform the remaining required subtraction operations. For example, in the example above in which seven subtractions are required, four subtraction circuits could be reused twice to perform each of the seven required subtractions (one subtraction being redundant). Each subtraction circuit may be implemented as an adder circuit that performs its subtraction operation using two's complement arithmetic.

For purposes of illustrating the invention, FIG. 1 is a block diagram of an exemplary hardware implementation of the LZW compression algorithm in which the modulo division circuit and method of the present invention may be employed, specifically as part of a hashing algorithm used in the implementation. LZW performs a compression function by dynamically constructing a dictionary of strings which represents the contents of an input string of bytes in real time as the string is read for input to the circuit. As the dictionary is constructed, code words are associated with unique character strings contained in the input data stream. These code words are output as the compressed representation of the input data stream. The compressed output has the property that the dictionary can be reconstructed during the decoding process. It is then used during the decoding process to rebuild the original input string. The dictionary itself is not sent with the compressed data. Further information concerning the LZW compression algorithm is provided in U.S. Pat. No. 4,558,302, which is hereby incorporated by reference in its entirety.

As shown in FIG. 1, the exemplary LZW implementation comprises a hashing function 30, a hash table 32, including control and memory circuitry, a dictionary module 34, including control and memory circuitry, and an assembly register/output module 36. The hashing function 30 produces index values based upon byte string values from the input data stream that are presented to the hash function 30. A modulo 9973 division calculation is performed on this index and the resultant remainder value is used as a table address to assign locations in the hash table 32 to code word values representing the string just hashed. It is this modulo 9973 division calculation that the present invention can be employed to perform. The hash table 32 is a record of all the preceding hash function processing activity upon the input data stream. The code word stored at each hash table address location in the hash table is the address of a string in the dictionary 34 (i.e., the code word is associated with that string and is substituted for that string in the compressed output). The dictionary 34 is a table of linked lists of strings linearly assigned and addressed. It contains all of the data strings which have been remapped to code words thus far in the compression execution. The combination of the hash function 30 and the hash table 32 provides a quick look-up mechanism to locate all data strings in the dictionary 34. The dictionary 34 is involved in the input string look-up and compare process to confirm that the string being compared from the input file is actually the same as the one stored in the dictionary 34. This compare is necessary due to the property that the hashing function is not unique. That is, many strings can generate the same hash index. It is only by comparing the data value being hashed with that already stored in the dictionary 34 that it is possible to confirm that the input string actually matches the stored string. If it does not match, a re-hash is required until either the matching stored string is found or an unused hash table location is found, indicating the input string is not stored and now must be stored by means of a new write operation. The assembly register/output module 36 receives the code words representing the compressed output and assembles the code words to produce an output data stream. The compressed output consists entirely of a string of code words. Some of the code words represent special control characters, but most of the code words represent unique strings of various length used, in the process of LZW decoding, to reconstruct the original data.

As mentioned above, the present invention can be used to implement the modulo 9973 operation in the hashing function 30 of the LZW circuitry of FIG. 1. In the exemplary circuitry of FIG. 1, the hash table 32 has 4096 (4K) entries (the same as the number of entries in the Dictionary)

distributed in a physical table of 9973 entries (the other locations remain "unused" and are tagged as such). The reason for the excess capacity is to not force the hashing function to assign all the available locations. Assignment becomes more inefficient as less locations are "unused" and available for assignment. The purpose of the hashing function, therefore, is to generate from a byte of the input stream, combined with the current value of the hash index, a value in the range of 0 to 9972, and as uniformly distributed within that range as possible for use as an address into the Hash Table. In the exemplary circuitry of FIG. 1, the hashing function receives as an input, a 16 bit word based on a combination of a byte from the input data stream and past hash indices. The output of the hashing function must be deterministic and repeatable, such that the same input byte string will always produce the same hash table address. A modulo operation (along with the other hash processing operations) will provide such a result. Specifically, in the exemplary circuitry of FIG. 1, a Modulo (9973) operation is performed on the 16 bit intermediate hashing function result to produce an output in the range of 0 to 9972. As can be appreciated, because the 16-bit input value can range from 0 to 65535, the maximum possible quotient value of the Modulo (9973) operation is 6. That is, in this exemplary application of modulo division, the quotient of the modulo operation will range between two relatively small, predictable integer values −0 and 6. The present invention can be used to speed the performance of the modulo division operation in this application.

Figure 2:
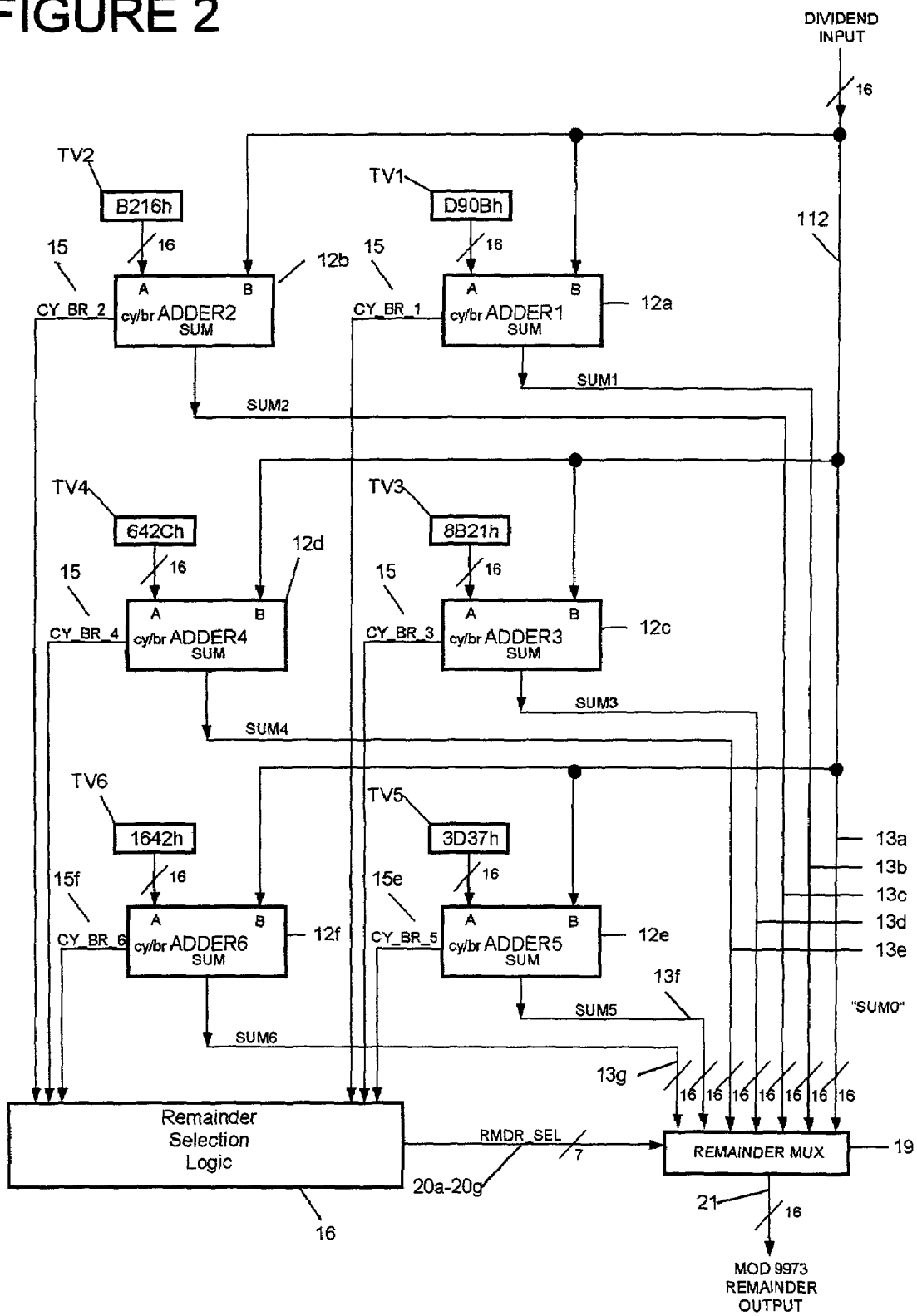
FIG. 2 is a block diagram illustrating one embodiment of a circuit for performing modulo division in accordance with the present invention.

FIG. 2 is a block diagram of an embodiment of a modulo division circuit in accordance with the present invention, adapted for use in an implementation of the hashing function 30 of the exemplary LZW implementation of FIG. 1. Specifically, this exemplary embodiment performs the required modulo 9973 operation discussed above.

As shown, in this embodiment, the modulo division circuitry comprises six subtraction circuits $12a$–$12f$. In this embodiment, each of the subtraction circuits is implemented by an adder that performs its respective subtraction operation using two's complement arithmetic. However, in other embodiments, other logic circuits can be used to implement the required subtraction operations.

Each of the adders $12a$-$12 f$ receives, as one input, a common dividend signal 112 representing the 16 bit intermediate input to the hashing function, from which a hash table address in the range of 0 to 9972 must be generated. As mentioned above, the divisor in this application is 9973. Because the possible quotient values range from 0 to 6, seven subtraction operations using different multiples of the divisor are performed in parallel. Accordingly, each adder $12a$–$12f$ receives, as a second input, a respective test value signal (TVn) representing, in two's complement form, a different integer multiple of the divisor. Specifically, each test value signal represents the multiplication of the divisor with a different one of the possible quotients that can result from the division of the dividend by the divisor (except for the case of quotient=0, which is a special case as discussed below). Each adder adds its respective test value signal (in two's complement form) to the common dividend signal to thereby subtract the respective integer multiple of the divisor from the common dividend input to produce a respective remainder signal and a respective carry/borrow signal.

In this embodiment, the following test signal values are employed:

TV0=0000h, which represents the two's complement of (0*divisor);

TV1=D90Bh, which represents the two's complement of (1*divisor);

TV2=B216h, which represents the two's complement of (2*divisor).

TV3=8B21h, which represents the two's complement of (3*divisor);

TV4=642Ch, which represents the two's complement of (4*divisor);

TV5=3D37h, which represents the two's complement of (5*divisor); and

TV6=1642h, which represents the two's complement of (6*divisor).

The test value signals may be hard coded in the logic of the circuit of the present invention, so that no processing is required to produce them. Hard coding these values helps to speed execution of the circuit. In other embodiments, however, the test value signals can be calculated, or retrieved from a memory, such as a look-up table, depending upon the application. Preferably, all of the test value signals are available to the adder circuits $12a$–$12f$ prior to, or substantially simultaneously with, the dividend signal.

As further shown, there is no actual adder for subtracting TV0, the signal representing a value of 0000h. Subtracting 0000h from the dividend has no effect. Consequently, the adder that would otherwise be used to perform that subtraction is eliminated and the dividend signal 112 is merely passed through as the output (shown as "SUM0") of that "virtual" adder. It is understood that, in other embodiments, the circuit of FIG. 2 can be expanded to include as many adders as necessary to cover each of the possible quotient values by which the divisor is multiplied.

As mentioned, each adder $12a$–$12f$ plus the "virtual" adder for 0000h produces a respective remainder signal, denoted respectively $13a$-13 g. With the exception of the "virtual" adder for 0000h, the adders $12a$–$12f$ each also output a respective carry/borrow signal $15a$–$15f$. Each one of the remainder signals $13a$–$13g$ represents a respective remainder resulting from the subtraction of a respective integer multiple of the divisor from the common dividend. Each of the respective carry/borrow signals $15a$–$15f$ assumes a BORROW=TRUE logical value when the respective subtraction operation results in an underflow condition of the adder executing the subtraction, and assumes a BORROW=FALSE logical value otherwise. As shown, the respective remainder values are passed to respective inputs of a multiplexer 19.

Combinatorial logic, collectively illustrated in FIG. 2 as remainder selection logic 16, uses the respective carry/borrow signals $15a$–$15f$ to determine which of the seven different remainder values is the valid one. Once identified, a suitable signal (i.e., RMDR_SEL) can be generated to control the multiplexer 19 to select the valid remainder for output. The valid remainder represents the output of the Modulo (9973) operation.

Figure 5:
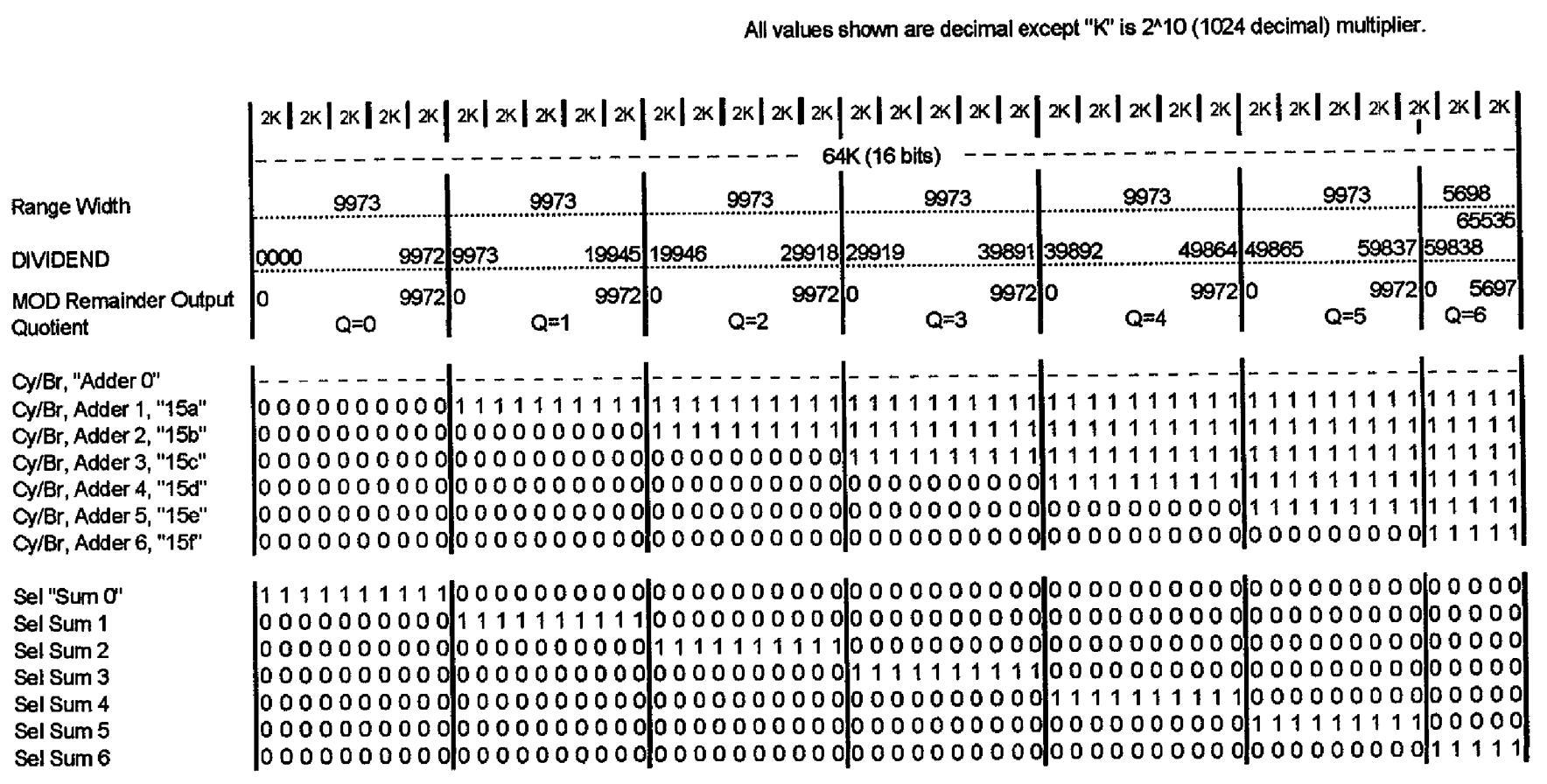

Further illustration of the overall operation of the circuit of FIG. 2, and in particular the selection process, is provided by the truth table illustrated in FIG. 5. In the table, the top row containing the "2K" entries is essentially a ruler. It divides the range of 64K possible dividend values into small 2K increments. The format of the table is abbreviated in that it does not contain 64K explicit inputs, but rather, groups contiguous ranges of inputs having the same output values in the interest of compactness. The next row indicating the full range of dividend input values is 64K in size. This is determined by the fact that the dividend input is 16 bits in width. Dividend input values range from 0 to 64K−1. Each range of input values that has a common set of outputs contains 9973 values except for the highest range which only has 5698 values. This is indicated on the row labeled "Range Width". Note that the ranges do not fall on exact 2K boundaries even though the limited resolution of the drawing makes it look that way. The row labeled "Dividend" indicates the beginning and end values of the dividend input within each range. The row labeled "MOD Remainder Output" indicates the beginning and end values of the MOD remainder output associated with each corresponding dividend input value. The row labeled "Quotient" indicates the quotient value corresponding to each range of dividend input values. The groupings of carry/borrow outputs (i.e., "Cy/Br") indicate the behavior of these outputs from the adders. The signal polarity assignment of the Cy/Br signal is BORROW=FALSE='1' and BORROW=TRUE='0'. Note that the entry for Cy/Br "Adder 0" is blank. This is because that adder is a "virtual" adder, as discussed above. The Cy/Br outputs have a simple characteristic of filling in '1' outputs as the Dividend increases in value. Note that the selector values needed to select the proper adder remainder output can be produced with a very simple combinational function of the six Cy/Br outputs. For example, a function of all Cy/Br values='0' generates the Sel "Sum 0" selector control signal.

With reference to the truth table and the circuit of FIG. 2, the following discussion relates the circuit actions as the dividend takes on values throughout its possible range of input values. When the dividend lies in the range of 0000 to 9973, the correct remainder value is equal to the value of the dividend itself. As can be seen from the truth table, there is no carry/borrow output of adder 0 (the "virtual adder"). However it is implicitly a value of BORROW=FALSE because subtracting 0000h cannot cause an underflow. As can be seen from the truth table, all the remaining carry/borrow outputs, signals 15a through 15f are indicating a BORROW=TRUE condition and thus are all underflowing and invalid. Thus, the highest order TVn adder not underflowing is "virtual" adder 0. Accordingly, the dividend input value from "virtual" adder 0 is selected for output. When the dividend lies in the range of 9973 to 19945, the correct remainder value is present on the output of adder 1. Again "virtual" adder 0 implicitly outputs a BORROW=FALSE value and as can be seen from the truth table, the carry/borrow output of adder 1, signal 15a, is also indicating a BORROW=FALSE condition. The remaining carry/borrow outputs of adder 2 through adder 6, signals 15b through 15f are indicating a BORROW=TRUE condition and thus are all underflowing and invalid. Thus, the highest order TVn adder not underflowing is adder 1. Accordingly, the remainder value from adder 1 is selected for output. A corresponding description applies for dividend values in the ranges of 19946 to 29918 and adder 2 output, 29919 to 39891 and adder 3 output, 39892 to 49864 and adder 4 output, 49865 to 59837 and adder 5 output. Finally, when the dividend lies in the range of 59838 to 65535, the correct remainder value is present on the output of adder 6. Again "virtual" adder 0 implicitly outputs a BORROW=FALSE value and as can be seen from the truth table, the carry/borrow output of all adders 2 through 6, signals 15a through 15f, are also indicating a BORROW=FALSE condition. Thus none of the adder outputs is underflowing. In this case, the highest order adder, adder 6, is selected for output.

Figure 3:
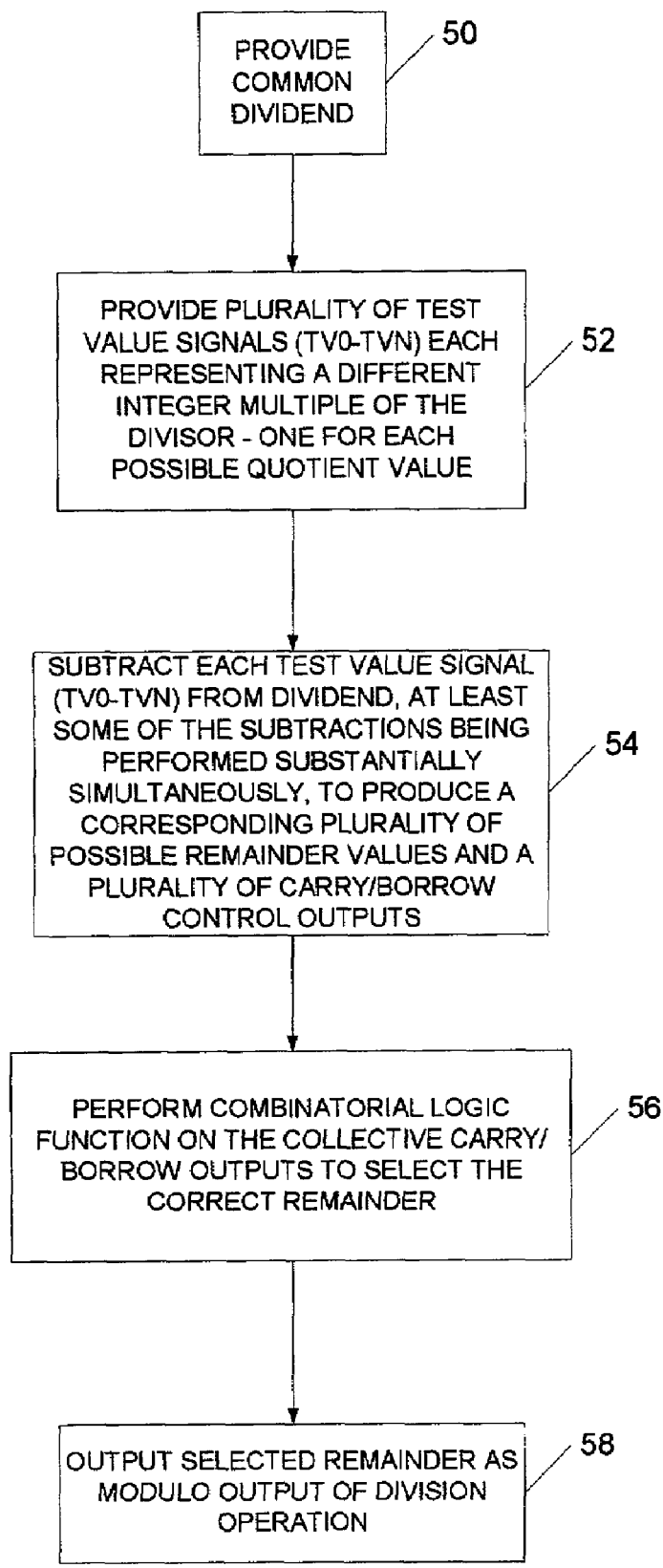
FIG. 3 is a flow diagram illustrating both further details of the operation of the circuitry of FIG. 2, as well as one embodiment of a method of the present invention.

FIG. 3 is a flow diagram illustrating both further details of the operation of the circuitry of FIG. 2, as well as one embodiment of a method of the present invention. This flow is provided for conceptual description purposes. It approximates the flow of signals through the circuitry. Note, however, that the absolute ordering of signal flow is determined by logic propagation characteristics and not any form of sequential logic control. With reference to FIG. 3, at step 50, a dividend signal is provided that represents the dividend.

Next, at step 52, a plurality of respective test value signals TV0–TVN are provided, with each one of the test value signals TV0–TVN representing a respective integer multiple of the divisor. The plurality of respective test value signals TV0–TVN may be expressed in two's-complement form. Each test value signal represents a multiplication of the divisor by a different one of the possible quotients that may result from the division operation.

At step 54, each one of the respective test value signals TV0–TVN is subtracted (e.g., through the process of two's complement addition) from the dividend signal to provide a plurality of respective remainder signals. Each one of the respective remainder signals (e.g., signals 13a–13g in FIG. 2) represents a potentially valid remainder resulting from division of the dividend by the divisor. That is, one of the test value signals will constitute the integer multiple of the divisor that corresponds to the actual quotient resulting from the division, and thus the remainder signal resulting from the subtraction of that integer multiple of the divisor from the dividend will be the true remainder of the division operation. As discussed above, all of the subtraction operations on different integer multiples of the divisor are performed substantially simultaneously, thereby reducing the overall time required for the circuit and method to generate the correct modulo output.

At step 56, each one of the remainder signals 13 is evaluated for validity. As described above, this step of evaluating can be accomplished by a simple combinational function of the plurality of carry/borrow outputs. At step 58, the remainder value that is identified and selected in step 56 as the valid remainder is output as the result of the modulo division operation.

FIGS. 6A and 6B provide a VHDL description of the combinational logic function of the plurality of carry/borrow outputs which selects the true and correct remainder from the plurality of remainders generated by the adders. It also illustrates a method for generating the numerical quotient value from the circuit. This description corresponds to block 16 of FIG. 2, "Remainder Selection Logic". Its output, RMDR_SEL, is used to select the correct adder output in block 19 of FIG. 2, "Remainder Mux". The VHDL description of FIGS. 6A and 6B is for illustrative purposes only and is not intended to compile.

Figure 2A:
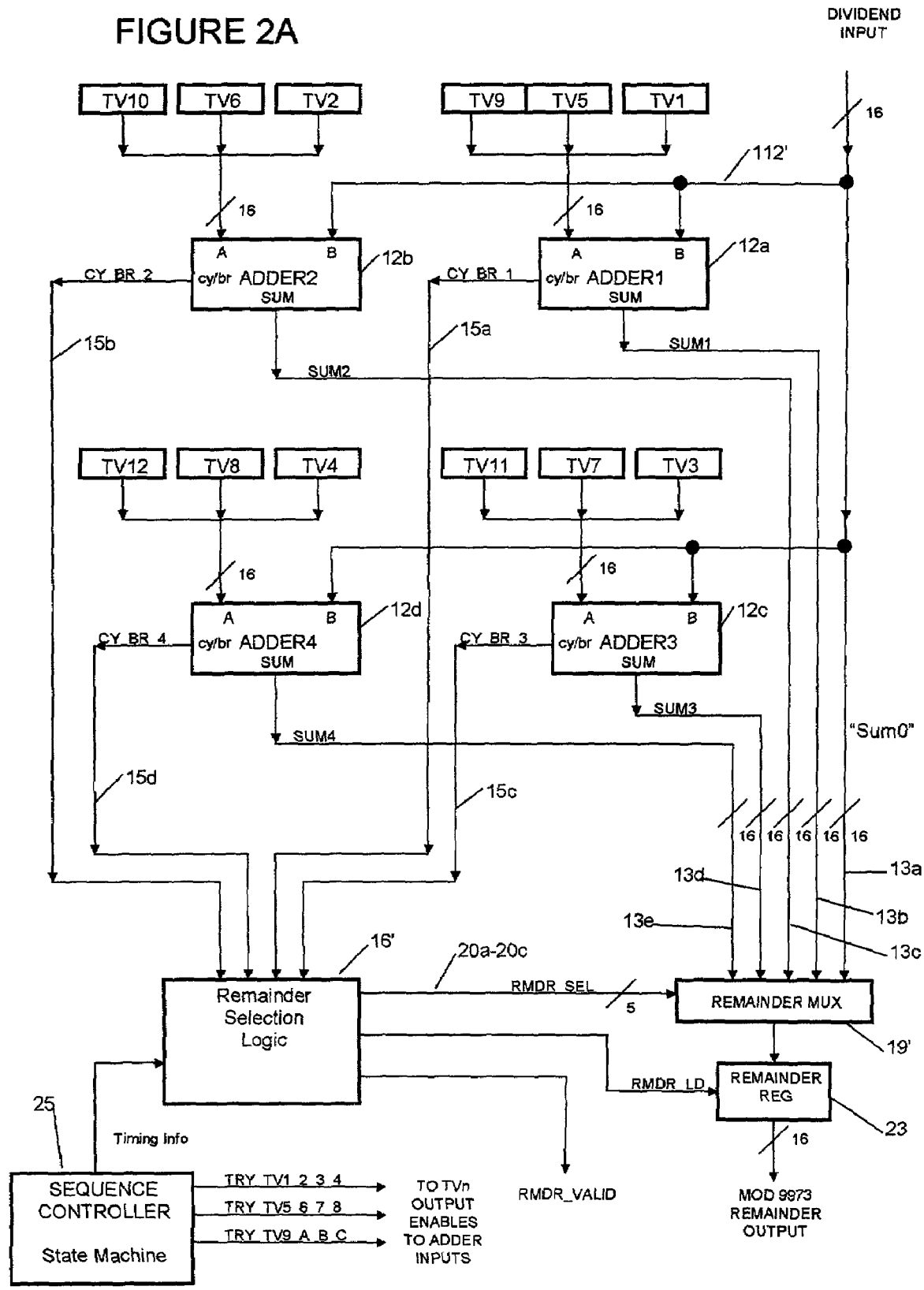
FIG. 2A is a block diagram illustrating an alternative embodiment of a circuit for performing modulo division in accordance with the present invention.

FIG. 2A is a block diagram of an alternative embodiment of the modulo division circuit of the present invention. In this embodiment, sequential reuse of a smaller number of subtraction circuits (e.g., adders performing two's-complement arithmetic) is implemented. With sequential reuse, subsets of test value signals TVn are mapped onto all the possible values of TVn. One subset is processed each cycle of a sequence controller 25. Typically, there will be as many sequencer control cycles as there are subsets of TVn, as determined by the design constraints and optimizations employed in the mapping process. In this model, the TVn values may not map evenly into the number of available TVn processing "slots," thus wasting some processing capacity. In such a case, the unused adder inputs may be padded out with redundant TVn values. The redundant, as well as non-redundant, values must be applied in monotonically increasing TVn value order.

The circuit of FIG. 2A represents one of many possible implementations. In this example, four adders 12a–12d are used to sequentially process thirteen different test values (TV0–TV12), in subsets of five, four and four test values. As in the embodiment of FIG. 2, for the test value representing 0000h, the dividend is passed through as the output of a "virtual" add operation on that test value, leaving twelve actual subtraction operations (i.e., using two's complement addition). The 0000h test value is processed by the "virtual adder" in the first cycle along with TV1 to TV3. One subset of four test value signals is processed during each of three sequencer control cycles. A sequence controller 25 controls which of the three subsets test values signals is applied to the adders 12a–12d during each sequence control cycle. In this example, during a first cycle, test value signals TV1, TV2, TV3, and TV4 are applied to the adders to produce respective remainder and carry/borrow signals. During a second cycle, test value signals TV5, TV6, TV7, and TV8 are applied to the adders, and during a third cycle, test values signals TV9, TV10, TV11, and TV12 are applied. Note that the result of TV0, "SUM0", is available on all cycles, but is only tested in the first cycle.

Remainder selection logic 16' then evaluates each one of the remainder signals of the current subset for validity. This step of evaluating is accomplished by a first combinational function of the plurality of carry/borrow outputs 15a–15d. It may not be possible to determine validity in a given cycle of the sequence controller 25. This event would occur when the plurality of carry/borrow outputs of a given subset of TVn values are all assuming a BORROW=FALSE logical value. In this case, the highest order remainder output from the subset is selected for latching into a remainder register 23 as a potential true remainder candidate to be possibly validated on the next sequence controller 25 cycle. Another simple combinational function of the plurality of carry/borrow outputs is used to indicate whether or not a potential remainder output will be latched in the remainder register 23 to replace an existing potential value as the true remainder value. This signal is labeled RMDR_LD in FIG. 2A. Yet another simple combinational function of the plurality of carry/borrow outputs is used to indicate when a potential remainder output is present as the true remainder output. This signal is labeled as RMDR_VALID in FIG. 2A. All of these combinational logic functions can be implemented in the remainder selection logic 16'.

FIGS. 7A–7D provide a VHDL description of the operation of the sequence controller 25 and remainder selection logic 16'. The VHDL description is for illustrative purposes only and is not intended to compile. All signals are assigned such that TRUE='1' and FALSE='0'.

Figure 4:
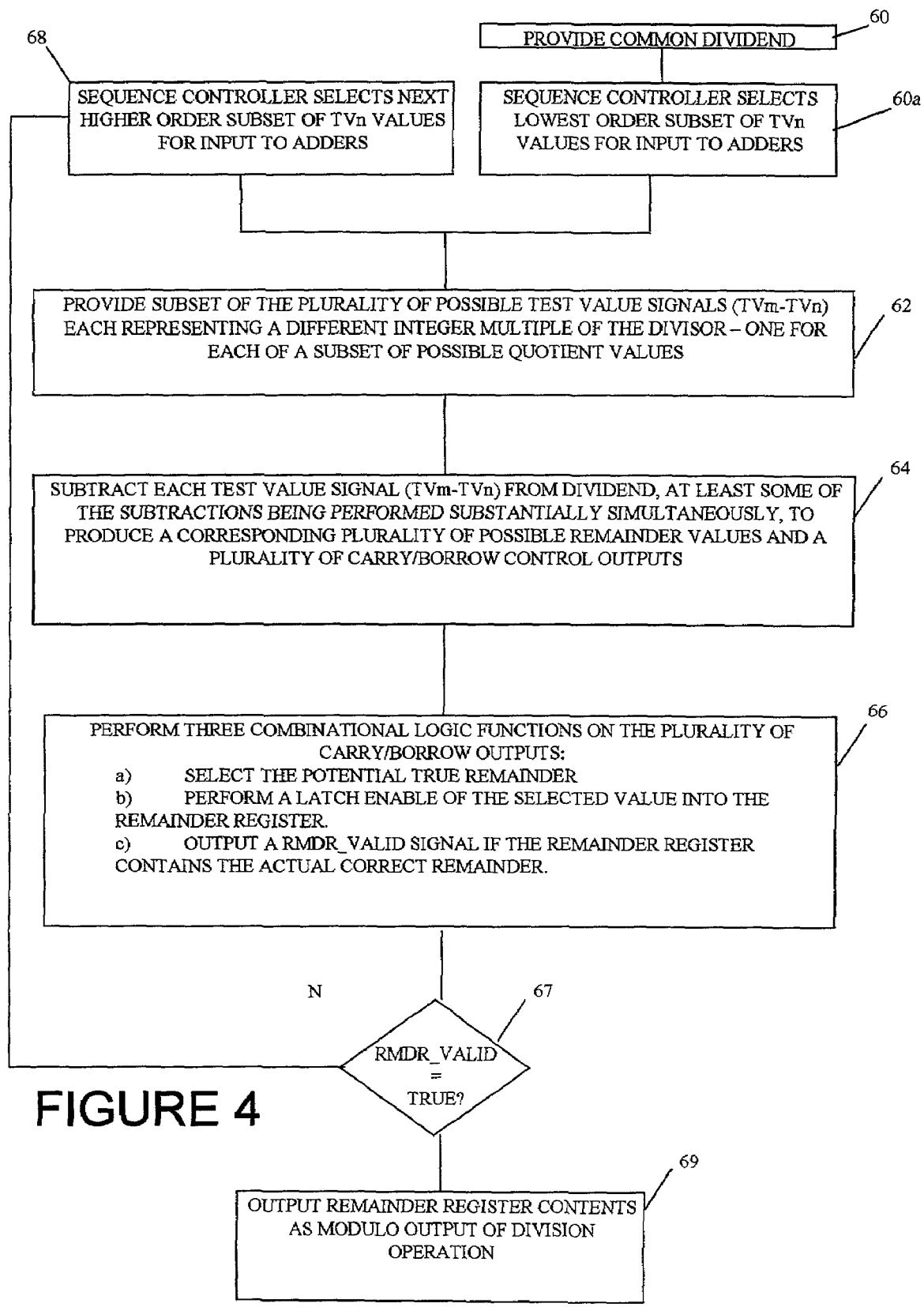
FIG. 4 is a flow diagram illustrating both further details of the operation of the circuitry of FIG. 2A, as well as another embodiment of a method of the present invention.

FIG. 4 is a flow diagram illustrating further details of the operation of the circuitry of FIG. 2A, in accordance with this alternative embodiment of the present invention. This flow is provided for conceptual description purposes. It describes the selection of signals by the sequence controller 25 and the subsequent flow of signals through the combinational circuitry. Note, however, that the absolute ordering of combinational signal flow is determined by logic propagation characteristics and not any form of sequential logic control. The sequence controller 25 is responsible for the control of the selection of subsets of TVn values to the adder inputs in order of monotonically increasing TVn values, and the source of cycle count information to the remainder selection logic 16'.

With reference to FIG. 4, at step 60, a dividend signal is provided that represents the value applied to the dividend input 112'. Next, at step 60a, the sequence controller 25 is in its initial processing state and selects the subset of the lowest order group of TVn values as input to the plurality of adders 12a–12d. Note from above that, in addition to the explicit TVn values, an implicit TV0 value is also selected in the form of the "Sum0" input representing the value of 0*divisor=0000h subtracted from the dividend. This implicit TV0 and its associated remainder value is only evaluated as a possible true remainder with the lowest order subset of TVn values. It is not evaluated as a possible true remainder in later sequence controller 25 cycles when the higher order subsets of TVn are processed and evaluated.

Next, at step 62, the subset of test value signals, TVm through TVn, are selected by the sequence controller logic 25, with each one of the test value signals TVm through TVn representing a respective, monotonically increasing from 1, integer multiple of the divisor. For example, in FIG. 2A, test value signals TV1, TV2, TV3, and TV4 may comprise the first subset.

At step 64, each one of the selected test value signals TVm through TVn of the current subset is subtracted (e.g., using two's complement arithmetic with respective adders 12a–12d) from the dividend signal to provide a plurality of respective remainder signals for the subset. Each one of the respective remainder signals represents a potentially valid remainder resulting from division of the dividend by the divisor. That is, one of the test value signals in this subset may constitute the integer multiple of the divisor that corresponds to the actual quotient resulting from the division, and thus the remainder signal resulting from the subtraction of that integer multiple of the divisor from the dividend may be the true remainder of the division operation. Each one of the respective subtraction operations also preferably produces a respective carry/borrow signal that assumes a BORROW=TRUE logical value when the step of subtracting results in an underflow condition of the adder, and assumes a BORROW=FALSE logical value otherwise.

At step 66, each one of the remainder signals for the current subset is evaluated for validity. This step of evaluating is accomplished by a first combinational function of the plurality of carry/borrow outputs (e.g., carry/borrow outputs 15a–15d in FIG. 2A). It may not be possible to determine validity in a given cycle of the sequence controller 25. This event would occur when the plurality of carry/borrow outputs of the subset of TVn values are all assuming a BORROW=FALSE logical value. In this case, the highest order remainder output from the subset is selected for latching into the remainder register 23 as a potential true remainder candidate to be possibly validated on the next sequence controller 25 cycle (step 66a). A second simple combinational function of the plurality of carry/borrow outputs indicates whether or not a potential remainder output will be latched in the remainder register 23 to replace an existing potential value as the true remainder value (step 66b). A third combinational function of the plurality of carry/borrow outputs indicates when a potential remainder output is present as the true remainder output (step 66c). This signal is labeled as RMDR_VALID in FIG. 2A. Further details of one embodiment of these combinational functions are provided in the VHDL description of FIGS. 7A–7D.

Still referring again to FIG. 4, at step 67, the RMDR_VALID signal is sampled and evaluated by the sequence controller 25. If this signal is FALSE, the sequence controller 25 continues its operation by sequencing to the next sequencer state which causes the next higher order subset of TVn inputs to be selected for input to the adders, as shown at step 68. Steps 62 through 66 are repeated with this new subset of TVn values. The flow is identical to the first cycle with the exception that the "Sum 0" value is not considered as a potential true remainder for all cycles following the first. If the RMDR_VALID signal is sampled TRUE, the sequence controller 25 will take no further action.

At step 69, the remainder value that is identified and selected in step 66 as the valid remainder is output as the true result of the modulo division operation. The signal RMDR_VALID identifies it as the true remainder. At the end of the time interval representing the sequence controller 25 cycle time, the controller 25 completes the processing cycle and transitions back to the cycle 1 state and begins processing a new dividend input.

In the example of FIG. 2A, it will require from 1 to 3 cycles of the sequence controller 25 to obtain a true remainder output. The number of cycles will increase as the value of the dividend input increases. The selection of the ordering of the TVn values in monotonically increasing order is important to the ability of the method to efficiently resolve the validity of the true remainder. This is true because in the evaluation of the carry/borrow outputs it is assumed that each successively increasing order of carry/borrow output is associated with an increasing value of TVn. This association is what enables the largest value of non-underflowing remainder output to be identified and selected for output.

As the foregoing illustrates, the present invention is directed to circuits and methods for performing a modulo division operation. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A circuit for calculating and outputting a modulo value resulting from a simulated division of a dividend by a divisor, the circuit comprising:
   a plurality of subtraction circuits, each one of the subtraction circuits receiving as a first input a common dividend signal representing the dividend and, as a second input, at least one respective test value signal representing a respective integer multiple of the divisor, each one of the subtraction circuits subtracting the respective test value signal input to the subtraction circuit from the common dividend signal to produce a respective remainder signal and a respective carry/borrow signal; and
   logic coupled to receive each of the corresponding carry/borrow signals and to determine therefrom which of the remainder signals represents a true remainder of the division of the dividend by the divisor.

2. The circuit recited in claim 1, further comprising a multiplexer that receives each of the remainder signals and, in response to a signal from said logic, outputs the remainder signal representing the true remainder of the division operation.

3. The circuit of claim 1, wherein the plurality of subtraction circuits execute the respective subtraction operations substantially simultaneously.

4. The circuit of claim 1, wherein the respective test value signals are hard coded in the circuit.

5. The circuit of claim 1, wherein each one of the subtraction circuits receives as its second input, at least a further test value signal representing a further integer multiple of the divisor, and wherein each one of the subtraction circuits subtracts the test value signal from the dividend signal during a first subtraction operation and subtracts the further test value signal from the dividend signal during a second subtraction operation.

6. The circuit of claim 1, wherein the plurality of subtraction circuits is used during a first subtraction cycle to perform respective subtractions using a first subset of respective test value signals, and wherein the plurality of subtraction circuits is then reused during a second subtraction cycle to perform respective subtractions using a second subset of respective test value signals.

7. The circuit recited in claim 6, further comprising a sequence controller that controls the input of the first and second subsets of test value signals to the subtraction circuits during the respective first and second subtraction cycles.

8. The circuit recited in claim 1, wherein the dividend comprises a variable dividend having a value ranging from 0 to 65535 inclusive, and wherein the divisor comprises a fixed value of 9973.

9. The circuit recited in claim 1, wherein each subtraction circuit comprises an adder that receives as its first input the common dividend signal and as its second input a two's complement form of said at least one respective test value signal, and wherein each adder performs its respective subtraction operation using two's complement arithmetic.

10. The circuit recited in claim 1, wherein the respective test value signals are available as inputs to each subtraction circuit prior to each subtraction circuit receiving said common dividend signal.

11. The circuit recited in claim 1, wherein the respective test value signals are available as inputs to each subtraction circuit substantially simultaneously with each subtraction circuit receiving said common dividend signal.

12. A method performed by data processing apparatus for compressing an input data stream represented by a plurality of electrical signals, said method comprising:
   processing said input data stream to produce index values based upon byte string values from said input data stream, each of said index values being represented by a respective dividend signal;
   providing a divisor signal having a fixed value;
   performing a simulated modulo division of each dividend signal by said divisor signal comprising the steps of:
      providing a plurality of test value signals each representing a different integer multiple of said divisor signal;
      for each dividend signal resulting from said processing, applying the dividend signal along with said test value signals to subtraction means for separately subtracting each test value signal from the dividend signal so as to produce a respective remainder signal and a respective carry/borrow signal for each test signal, and
      processing said respective remainder signals and said respective carry/borrow signals to determine which of the remainder signals represents a true remainder for the division;
   using the determined true remainders to assign locations in a dictionary for storing code words representing said input data stream; and
   outputting and assembling code words from said dictionary to produce a compressed representation of said input data stream.

13. The method recited in claim 12, wherein the dividend signal has a variable value ranging from 0 to 65536 inclusive, and wherein the divisor signal comprises a fixed value of 9973.

14. The method recited in claim 12, wherein said subtracting means performs said subtracting for a first subset of test value signals, and thereafter, is used again for performing subtractions for a second subset of test value signals.

* * * * *